United States Patent [19]

Kloster et al.

[11] Patent Number: 5,142,178
[45] Date of Patent: Aug. 25, 1992

[54] APPARATUS FOR ALIGNING STACKED LAMINATIONS OF A DYNAMOELECTRIC MACHINE

[75] Inventors: Gerald G. Kloster; Daryl Busch; John Tong, Jr., all of Sturgeon Bay, Wis.

[73] Assignee: Emerson Electric Co., St. Louis, Mo.

[21] Appl. No.: 684,311

[22] Filed: Apr. 12, 1991

[51] Int. Cl.⁵ .............................................. H02K 1/06
[52] U.S. Cl. .................................. 310/217; 310/216; 310/259
[58] Field of Search ............... 310/217, 218, 42, 65, 310/254, 257, 259, 261, 263, 268

[56] References Cited

U.S. PATENT DOCUMENTS

| | | | |
|---|---|---|---|
| 2,671,951 | 3/1954 | Sliwiak | 29/598 |
| 2,912,608 | 11/1959 | Ploran | 310/153 |
| 2,975,312 | 3/1961 | Ploran | 310/217 |
| 3,202,851 | 8/1965 | Zimmerle et al. | 310/259 |
| 4,149,309 | 7/1979 | Mitsui | 29/596 |
| 4,160,182 | 7/1979 | Mitsui | 310/214 |
| 4,280,275 | 7/1981 | Mitsui | 29/732 |
| 4,438,558 | 3/1984 | Mitsui | 29/732 |
| 4,494,101 | 1/1985 | Buchschmid et al. | 336/210 |
| 4,538,345 | 9/1985 | Diederichs | 29/596 |
| 4,578,853 | 4/1986 | Würth | 29/598 |
| 4,728,842 | 3/1988 | Martin | 310/217 |
| 4,900,636 | 2/1990 | Takenouchi et al. | 428/571 |
| 4,979,285 | 12/1990 | Martin | 29/598 |
| 5,075,150 | 12/1991 | Webb et al. | 428/162 |

Primary Examiner—Steven L. Stephan
Assistant Examiner—Dennis R. Haszko
Attorney, Agent, or Firm—Polster, Lieder, Woodruff & Lucchesi

[57] ABSTRACT

An apparatus and method for forming laminations for a stacked lamination assembly of a dynamoelectric machine wherein the laminations of the assembly are provided with displacement segments and complimentary openings of slightly larger dimensional size, the segments being configured to abate lateral shifting of adjacent laminations when the segments and compatible openings of the laminations are in nesting relation in a stacked lamination assembly.

8 Claims, 2 Drawing Sheets

APPARATUS FOR ALIGNING STACKED LAMINATIONS OF A DYNAMOELECTRIC MACHINE

BACKGROUND OF THE INVENTION

The present invention relates to dynamoelectric machines and more specifically to an apparatus and method for aligning stacked laminations of a dynamoelectric machine for use in either or both stator and rotor of such machine.

It is long known in the prior art of dynamoelectric machines in assembling laminations, typically between approximately forty sixty steel plates per inch, for stator and rotor cores of such machines to hold the assembled stacked lamination plates together along the axial dimension by either or both welding and cleating. It also is long known in the prior art to generally utilize displaced segments in the typical steel laminations, such segments being arranged to nestingly engage in complementary openings in adjacent laminations when the laminations are assembled in stacked relationship. This general type of arrangement for stator cores can be seen in long expired U.S. Pat. No. 3,202,851, issued to W. J. Zimmerle et al on Aug. 24, 1965. In this patent, cuts or slits are provided in each lamination and an arcuate interlock bridge portion is die punched therebetween to include a flattened portion raised from the planar surface of the lamination and connected thereto by opposed, stretched metallic angularly disposed shoulders. The bridge portion is then wedged into tight engagement with a compatible opening of an adjacent stacked lamination prior to an annealing treatment of the stacked lamination assembly. In later U.S. Pat. Nos. 4,149,309, issued on Apr. 17, 1979; No. 4,160,182, issued on Jul. 3, 1979; No. 4,280,275, issued on Jul. 28, 1981; and No. 4,438,558, issued on Mar. 27, 1984; all to Yoshiaki Mitsui, FIG. 4 of each of these patents discloses a similar arcuate interlock bridge portion formed in each lamination, and, as in the Zimmerle patent, the bridge portion is force fit into tight engagement with a compatible opening of an adjacent lamination. Still later U.S. Pat. No. 4,538,345, issued to Arthur Dieterichs on Sep. 3, 1985, teaches tapered or angular displaced lamination segments nesting in press fit relation with compatible openings in adjacent laminations. In this patent, bent tabs are utilized along the lamination perimeters ensure minimum axial separation prior to annealing of the lamination stack with a final axial pressing step being utilized to bend back the tabs after annealing. Finally, in U.S. Pat. No. 4,979,285, issued to Benson D. Martin on Dec. 25, 1990, angularly displaced segments are once again utilized to frictionally engage through applied pressure with compatible recesses of adjacent laminations.

In accordance with the present invention, it has been recognized that past stacked lamination assemblies in the art which have utilized the general principle of displacing lamination segments in the laminations to nest with compatible openings in adjacent laminations have failed to consider let alone minimize core losses in the nesting areas. In fact, the prior art has failed to recognize that application of pressure in the nesting areas creates core loss problems. Further, the prior art has failed to recognize problems of lateral shifting in stacked laminations which can result with the use of angularly shaped nesting bridges. On the other hand, the present invention not only recognizes these problems of the prior art but further recognizes the importance of maximizing close lamination alignment by simultaneously accomplishing certain select steps in the manufacturing operations. With the recognition and resolution of past prior art problems, the present invention provides a unique apparatus and method for avoiding, or at least minimizing, past problems in the art.

In accordance with the present invention, a novel and unobvious lamination stacking arrangement for a dynamoelectric machine is provided which is economical, straightforward and efficient in both manufacture and assembly and which avoids or at least minimizes the undesirable past problems associated with welding, cleating, riveting and gluing by eliminating the need for such. Further, the present invention avoids the need for undesirably piercing of the metallic laminations and substantially reduces detrimental magnetic effects and core losses in the stacked lamination assembly. In accordance with still another feature of the arrangement of the present invention, it is possible to obtain accurate alignment of stacked laminations, with minimum metal-to-metal frictional engagement which inhibits the annealing effect in lamination assembly and which results in high core loss due to lamination sticking and frequent short circuiting of magnetic flux paths in assembled laminations.

Various other features of the present invention will become obvious to one skilled in the art upon reading the disclosure set forth herein.

BRIEF SUMMARY OF THE INVENTION

More particularly the present invention provides a stacked lamination assembly for a dynamoelectric machine comprising: a plurality of stacked laminations, each of the laminations having lamination displaced segment means of preselected dimensional size and configuration and a complementary opening means of a preselected slightly larger dimensional size and compatible configuration to nestingly receive the lamination displaced segment means of an adjacent lamination in selectively spaced unconstrained aligned relationship therewith, each of the lamination displaced segment means being configured relative the planar face of the lamination from which it is displaced to abate lateral shifting of adjacent laminations beyond the preselected dimensional size difference between the nesting lamination displacement segment means and the complementary opening means of an adjacent lamination. In addition, the present invention provides a novel method for forming laminations for a stacked lamination assembly of a dynamoelectric machine from an initially blank strip of lamination material including as one of a plurality of successive die forming steps performed in spaced relation on the strip of lamination material, the step of simultaneously die forming an inner diameter, an outer diameter and alignment/register displaced segments and compatible openings on the strip of material to enhance accurate alignment of subsequently formed and stacked laminations.

It is to be understood that various be made by one skilled in the art one or more of the several parts of the novel stacked lamitation assembly and in one or more of the steps of the novel method of die forming the laminations without departing from the scope or spirit of the present invention.

BRIEF DESCRIPTION OF THE DRAWINGS

Referring to the drawings which disclose one advantageous embodiment of the present invention.

DETAILED DESCRIPTION OF THE DRAWINGS

Figure 1:
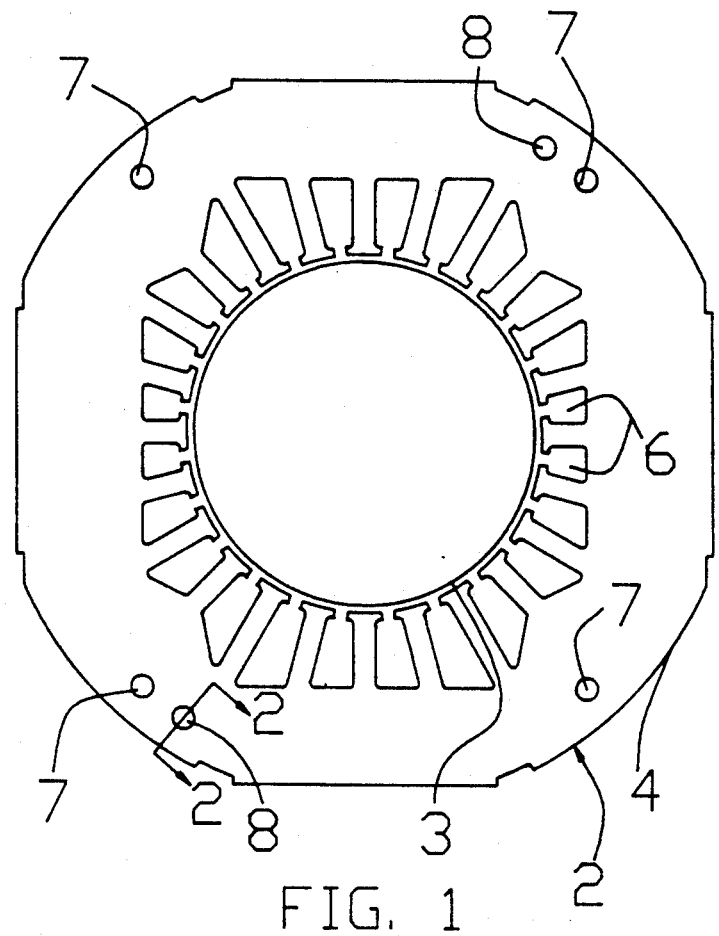
FIG. 1 is a plan view of stacked novel stator laminations incorporating the unique features of the present invention.
Figure 2:
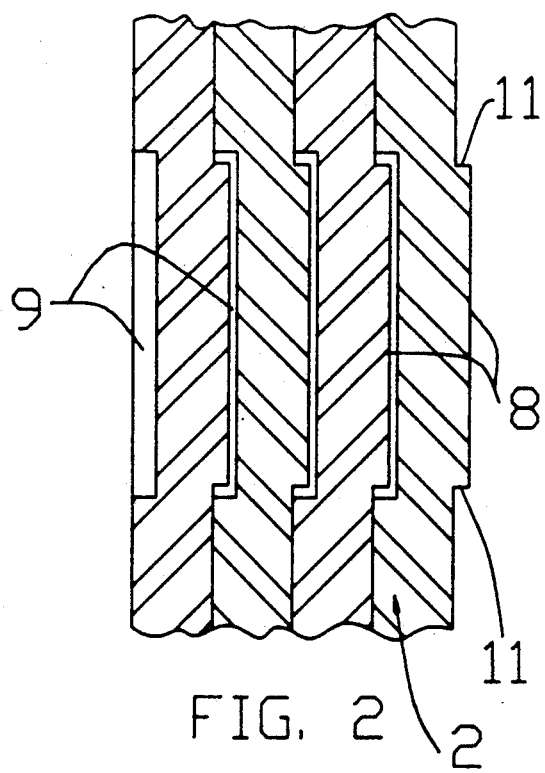
FIG. 2 is an enlarged cross-sectional view through line 2-2 of FIG. 1, disclosing in detail the nesting features of the displacement segments of a portion of the stacked laminations with compatible openings in adjacent laminations, particularly showing in exaggerated form the configuration of the displacement segments and their selectively spaced unconstrained aligned relation with compatible openings of adjacent laminations; and, FIG. 3 is a composite plan view of a continuous portion of a strip of blank lamination material representing the novel progressive die metal strip stamping steps for formation of both dynamoelectric machine rotor and stator components in accordance with the present invention.

Referring particularly to FIGS. 1 and 2 of the drawings, the outside lamination of a plurality of stacked stator laminations 2 can be seen. Each lamination 2 can be formed from any one of a number of suitable metallic steel strips known in the art for forming stator and rotor lamination assemblies, the strips having a preselected thickness to provide approximately forty to sixty laminations per inch in a stacked lamination assembly. Each lamination 2 includes a central inner diameter 3 and an outer diameter 4 and, in the embodiment disclosed, is geometrically configured to have a substantially rectangular shape with rounded corners. It is to be understood that the present invention is not to be considered as limited to such a geometric lamination configuration as shown but that other geometric shapes can be employed in accordance with the physical properties sought.

In the embodiment as disclosed, suitably spaced and shaped radially extending slots 6 are provided to extend radially outward from the central inner diameter 3. As known in the art and not shown, these slots each serve to receive an insulation sleeve for accommodating stator windings. In accordance with one of the novel features of the present invention, such insulation sleeves and stator windings passing therethrough provide sufficient structure for maintaining the stator laminations together in the completed stacked lamination assembly.

As can be seen in FIG. 1, each stator lamination can be provided at each of the four corners thereof with one of four spaced bolt holes 7, holes 7 serving to receiving through-bolts (also not shown) for fastening outer bearing support end caps-all as known in the art and therefore not shown.

In accordance with the present invention and as shown in FIGS. 1 and 2 of the drawings, each stator lamination can be provided with a spaced pair of diametrically opposed, circular, button-shaped extruded or displaced segments 8, the segments 8 of a pair being spaced 180 degrees apart approximately 30 degrees from one of two center lines extending through the center of a lamination normal to each other and to the opposed sides thereof. In forming these displaced segments 8 in stataor laminations 2, the displaced metal in the laminations are extruded and compressed to prese- lected dimensions which dimensions, as a consequence, are slightly less than the dimensions of the openings 9 which remain in the laminations 2 and which openings 9 are compatible with segments 8 of adjacent laminations.

In the embodiment disclosed, it has been found advantageous to provide displaced cylindrical button segments of approximately 0.185 to 0.186 inches in diameter with slightly larger openings of approximately 0.189 to 0.191 inches in diameter. The depths of the segments 8, measured from the planar faces of the laminations outwardly advantageously are approximately 0.010 to 0.011 inches and the depth of openings 8 in the laminations measure approximately 0.012 to 0.013 inches to thus leave a clearance of approximately 0.001 inches between nesting segments 8 and compatible openings 9 of adjacent laminations so as to minimize frictional engagement of adjacent surfaces of nesting parts during and after annealing operations.

As can be seen clearly in the exaggerated cross-sectional view of FIG. 2 of the drawings, each displaced cylindrical buttonshaped segment 8 has a peripheral cylindrical side surface 11 which extends substantially normal from the planar face of a stator lamination 2 from which it is formed and extends. This normally extending configuration serves to abate any possible lateral shifting of adjacent laminations 2 beyond the preselected slightly dimensional size difference of approximately 0.001 inches between nesting lamination displacement segments 8 and the slightly larger complementary openings 9 of adjacent laminations. As will be discussed more fully hereinafter, it is to be noted that segments 8 and compatible openings 9 advantageously are formed simultaneously with the formation of the inner and outer diameters 3 and 4 of stator laminations 2. This serves to enhance accurate alignment and nesting of the stacked laminations 2.

Figure 3:
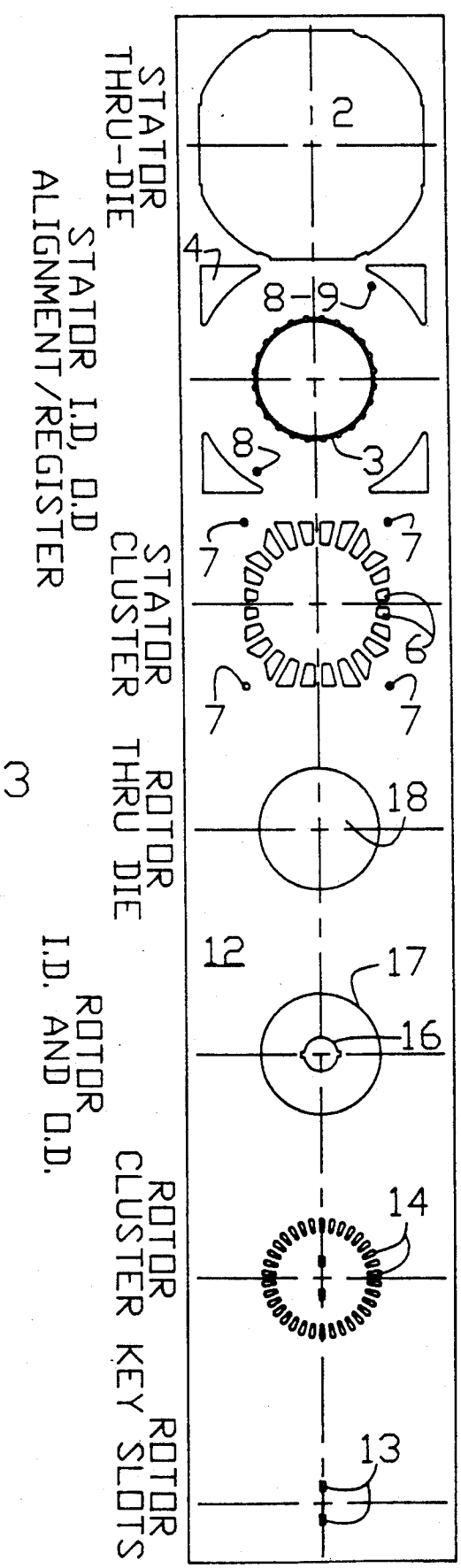

Referring to FIG. 3 of the drawings, the novel steps of the method are schematically disclosed in conjunction with a composite plan view of a portion of a continuous strip of blank lamination material 12 which serves to represent progressive die metal strip stampings for formation of both dynamoelectric machine rotor and stator laminations in accordance with the novel method of the present invention. In this regard, particular attention is directed to the stamping features of the sixth of the seven spaced stamping stations disclosed. In the first station, rotor key slots 13 are stamped or cut by a suitable die tool. In the second station, a suitable die tool stamps or cuts rotor cluster 14. In the third station, a die tool stamps or cuts the inner rotor diameter 16 and the outer rotor diameter 17. In the fourth station, the formed rotor lamination 18 (not disclosed in detail) is removed from strip 12 by an appropriate rotor through-die for stacking as part of a rotor assembly for subsequent treatment. The fifth to seventh spaced die tool stamping or cutting stations relate to formation of the stator laminations and include in the fifth station, the formation of the aforedescribed radially extending stator slots 6 and spaced bolt holes 7. In the sixth station, the inventive feature of simultaneously forming the central diameter 3, the outer diameter 4, and displaced segments and compatible openings 8 disclosed. As above stated, it is this inventive feature of simultaneously forming the inner and outer diameters and the alignment registers or segments and compatible openings that serves to enhance the accurate alignment of subsequently formed and stacked stator laminations. In the last or seventh station illustratively shown in FIG. 3, the formed stator lamination 2 (not disclosed in detail) is removed from strip 12 by an appropriate stator through-die for stacking the nesting aligned registrations as part of a stator assembly. The stator assembly is then annealed with the nesting displaced segments 8 slightly spaced from compatible openings 9 in adjacent laminations so as to minimize frictionally engaging contact and concomitant core losses. After annealing, suitable insulation sleeves and windings (not shown) are assembled in the radially extending slots 6 of a stator assembly and bearing support end caps along with a rotor assembly are assembled through the use of bolts extending in the above described through-bolt holes 7.

Thus, a unique, straightforward and efficiently manufactured and assembled dynamoelectric machine, can be provided with a minimum of parts and with a minimum of steps.

The invention claimed is:

1. A stacked lamination assembly for a dynamoelectric machine comprising:

a plurality of stacked laminations, each of said laminations having lamination displaced segment means of preselected dimensional size and configuration and a complementary opening means of slightly larger preselected dimensional size and compatible configuration to nestingly and freely engagingly receive the lamination displaced segment means of an adjacent lamination in selectively and fully spaced, unconstrained aligned relationship along opposed faces of nesting engagement, each of said lamination displaced segment means being continuously and uninterruptively configured throughout relative the planar face of a lamination from which it is displaced to abate lateral shifting of adjacent laminations beyond the preselected dimensional size difference between the nesting and freely engaging lamination displacement segment means and the complementary opening means of adjacent laminations.

2. The stacked lamination assembly for a dynamoelectric machine of claim 1, said stacked laminations being stator laminations.

3. The stacked lamination assembly for a dynamoelectric machine of claim 1, said stacked laminations being rotor laminations.

4. The stacked lamination assembly for a dynamoelectric machine of claim 1, said lamination displaced segment means having a peripheral side surface extending substantially normal from the planar face of the lamination from which it is displaced to abate lateral shifting between adjacent laminations.

5. The stacked lamination assembly for a dynamoelectric machine of claim 1, said nesting and freely engaging displaced segment means and complimentary opening means differing in size to provide a clearance along opposed faces therebetween of approximately one one thousandth (0.001) of an inch.

6. The stacked lamination assembly for a dynamoelectric machine of claim 1, each of said stacked laminations including inner and outer diameters and at lest one displaced segment means and complimentary openings means simultaneously formed to enhance accurate alignment of stacked laminations.

7. The stacked lamination assembly for a dynamoelectric machine of claim 1, said lamination displacement means including a spaced pair of displaced segments in each lamination and said complimentary opening means including a pair of similarly spaced openings of a preselected slightly larger dimensional size to nestingly and freely engagingly receive the pair of lamination displace segments of an adjacent lamination in selectively unconstrained aligned relationship therewith.

8. A stacked lamination assembly for a dynamoelectric machine comprising:

a plurality of stacked stator laminations, each of said stator laminations having a spaced pair of circular continuously and uninterruptively button-shaped displaced segments of preselected dimensional size and configuration and an aligned similarly spaced pair of circular button-shaped openings, said openings being approximately 0.001 inch dimensionally larger throughout of preselected size and compatible configuration to each nestingly and freely engagingly receive one of the two of the spaced pair of lamination displaced segments of an adjacent lamination, said lamination displaced button-shaped segments having a peripheral cylindrical side surface extending substantially normal from the planar face of the lamination from which it extends to abate lateral shifting of adjacent laminations beyond the preselected dimensional approximately 0.001 size difference between the nesting and freely engaging lamination displacement segments and the complimentary openings of an adjacent lamination, each of said stacked laminations including inner and outer diameters formed simultaneously with said pair of displaced segments and said aligned pair of openings to enhance alignment of stacked laminations.

* * * * *

UNITED STATES PATENT AND TRADEMARK OFFICE
CERTIFICATE OF CORRECTION

PATENT NO. : 5,142,178
DATED : August 25, 1992
INVENTOR(S) : Gerald G. Kloster, et al.

It is certified that error appears in the above-indentified patent and that said Letters Patent is hereby corrected as shown below:

Column 1, line 14, now "forty sixty" should be -- forty to sixty --.

Column 2, line 63, now "various be made" should be -- various changes can be made --.

Column 2, line 64, now "skilled in the art one" should be -- skilled in the art in one --.

Column 3, line 67, now "stataor" should be -- stator --.

Column 6, Claim 6, line 11, now "lest" should be -- least --.

Column 6, Claim 7, line 22, now "displace" should be -- displaced --.

Column 6, Claim 8, line 49, now "enhance alignment" should be -- enhance accurate alignment --.

Signed and Sealed this

Eleventh Day of October, 1994

Attest:

BRUCE LEHMAN

Attesting Officer

Commissioner of Patents and Trademarks